Sept. 8, 1970          W. REUS          3,527,091

TIRE TESTING APPARATUS

Filed June 21, 1968

INVENTOR
WALTER REUS
By Stevens, Davis, Miller & Mosher
ATTORNEYS

United States Patent Office 3,527,091
Patented Sept. 8, 1970

3,527,091
TIRE TESTING APPARATUS
Walter Reus, Neuses, Gelnhausen, Germany, assignor to The Dunlop Company Limited, London, England, a British company
Filed June 21, 1968, Ser. No. 739,028
Claims priority, application Germany, July 4, 1967, 1,648,435
Int. Cl. G01m 17/02
U.S. Cl. 73—146   13 Claims

ABSTRACT OF THE DISCLOSURE

Wheel and tire testing apparatus and method, the apparatus comprising a horizontal pivoted beam for carrying the wheel and tire under test and adapted to move the said wheel and tire into or out of engagement with a rotatable drum disposed with its axis horizontal. Pressure can be applied to the beam to press the wheel and tire against the drum periphery, and gauges connected to the beam e.g. at the horizontal pivot, determine the forces in the direction of the wheel and tire axis, said forces arising as the wheel and tire rotates.

---

This invention relates to an apparatus for testing tires and more particularly relates to an apparatus for the measurement of uniformity of tires by measuring the component forces which arise and act on the tire when it rotates.

Various forms of such apparatus have been disclosed but most of these have the disadvantage that they are not only complicated but also distortion of the suspension on which the tire is mounted can occur thereby causing the values of these component forces measured by the apparatus to be inaccurate.

It is an object of the present invention to provide a more simple form of apparatus which has neither of the disadvantages of the previous forms of testing apparatus. Thus, the tire testing apparatus of the present invention is not complicated and it is free from the problem of distortion.

According to the invention an apparatus for testing tires comprises a drum rotatably mounted on a substantially rigid framework with its axis of rotation horizontal, the peripheral surface of the drum being engaged by the tire during testing, the axes of rotation of the drum and the tire being spaced-apart and substantially mutually parallel, a measuring beam on one end of which the tire can be rotatably mounted, the length of the beam extending in substantially the same direction as the axis of rotation of the tire, means for rotating the drum, means for applying a force to the tire in a direction perpendicular to the axis of rotation thereof so as to press the tire against the drum, and means for measuring the force arising from the rotation of the tire acting in a direction parallel to the axis of rotation of the tire.

Preferably the measuring beam is pivotally mounted at its end further from the end of which the tire is rotatably mounted, and means are provided for moving the beam and the tire into or out of engagement with the drum e.g. to change the tire under test.

Preferably also the means for measuring the force acting in a direction parallel to the axis of the tire comprises at least one tension and compression measuring transducer mounted between the end of the beam furthest from the end on which the tire is mounted and a rigid framework.

According to the invention a method is also provided for testing a tire which comprises pressing said tire against a rotatable drum, the axes of rotation of said tire and the drum being horizontal and spaced apart, rotating the drum and measuring the force arising from said rotation in a direction along the axis of rotation of the tire.

One embodiment of the invention will now be described by way of example with reference to the accompanying diagrammatic drawings of which:

Figure 1:
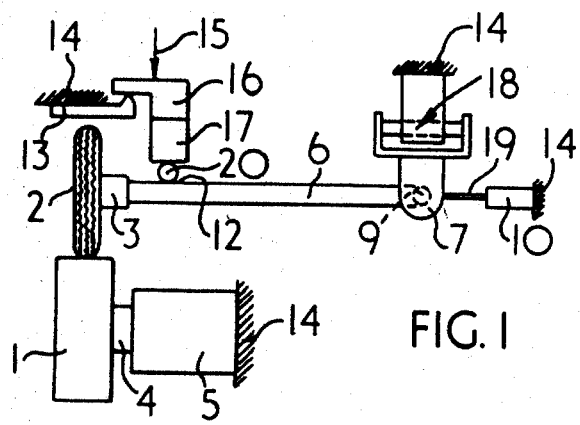
FIG. 1 is a diagrammatic side view of an apparatus according to the invention.

An apparatus for testing tires comprises a cylindrical rotatable drum 1 arranged with its axis of rotation horizontal, driven by a motor 5, a tire 2 under test being pressed against the outer periphery of the drum. The motor is mounted on a rigid framework 14 and a turning moment (or torque) gauge 4 is mounted between the motor and the drum, acting as a means of determining the rolling resistance of the tire.

Figure 2:
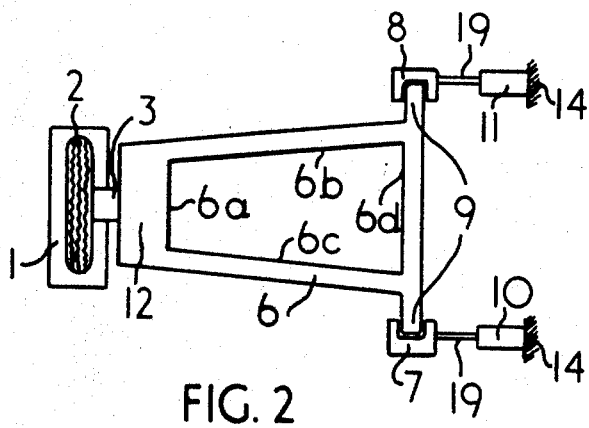
FIG. 2 is a digrammatic plan view of the apparatus shown in FIG. 1 with certain parts omitted for clarity.

The tire 2 is mounted on a wheel (not shown) which is rotatably mounted by means of a bearing 3 on a measuring beam 6. This measuring beam comprises four members 6a, 6b, 6c and 6d arranged in the form of a trapezoid (see FIG. 2), the plane of which is substantially horizontal. The bearing 3 is directly attached to the center of the member 6a which forms the shorter of the two parallel sides of the trapezoid, so that the member 6a is substantially perpendicular to the axis of rotation of the tire. The two members 6b and 6c which form the two non-parallel sides of the trapezoid are of equal length and are symmetrically disposed with respect to the axis of rotation of the tire, the members making equal angles, but in opposing senses, with the said axis.

The member 6d is formed at each end with a stub axle 9, the stub axles 9 being co-axially disposed, and each held in cup bearings 7 and 8. These bearings are each attached to the framework 14 by means of intermediate links slidable in bushes 18, so that the bearings and hence the stub axles can only move in a direction parallel to the axis of rotation of the tire.

The cup bearings 7 and 8 are also attached by means of rods 19 to tension and compression measuring transducers 10 and 11 mounted on the framework. The rods extend parallel to the direction of the axis of rotation of the tire so that any force on the tire in a direction parallel to the axis of rotation is measured by means of the transducers 10 and 11.

The cup bearings 7 and 8 enable the beam 6 to be swung upwards about a horizontal axis which is perpendicular to the axis of rotation of the tire and passes through the member 6d, so that the tire 2 can be moved out of engagement with the drum 1 so that it may be changed. Suitable means (not shown) for effecting this swing may comprise a pneumatic piston and cylinder assembly mounted between the beam 6 and the frame work 14. Means (not shown) are provided to adjust the vertical disposition of the bearings 7 and 8 and the transducers 10 and 11 so that the beam 6 and therefore the axis of the tire may be arranged to be accurately horizontal thus allowing for the accommodation of tires of different sizes.

The tire 2 is pressed against the cylinder 1 by applying pressure to the upper surface 12 of the shortest member 6a of the beam. This pressure is applied by any convenient means e.g. hydraulically in a vertical direction (shown in FIG. 1 in the direction of the arrow 15) on an intermediate member 16 which incorporates a pressure gauge 17 for measuring the pressure applied to the tire. A roller 20 disposed between the intermediate member 16 and the beam 6 substantially prevents any of the vertically applied pressure from affecting the forces acting in a direction parallel to the axis of rotation of the tire and which are measured by the two transducers 10 and 11. The intermediate member 16 engages an adjustable stop 13 which is used to measure the compression suffered by the tire.

In use of the apparatus a tire 2 is mounted on the wheel carried by the beam 6 which is swung into an approximately horizontal position. A force is applied at 15 so that either a desired force is applied to the tire or a desired compression of the tire results. The vertical heights of the cup bearings 7 and 8 and the transducers 10 and 11 are then adjusted so that the beam and tire axis are accurately disposed in a horizontal plane.

On starting the motor 5 the cylinder 1 and hence the tire 2 rotates. Because of the non-uniformity and internal stresses of the tire forces acting in a direction parallel to the axis of rotation of the tire will arise and be shown as electrical output signals from the transducers 10 and 11. The lateral or cornering force on the tire will be proportional to the sum of the two output signals whereas the difference of the two output signals is proportional to the rolling resistance. This rolling resistance is also measured by means of the turning moment gauge 4 mounted between the motor 5 and the cylinder 1.

In a modification of the aforementioned embodiment a tension and compression measuring gauge is mounted between the wheel carrying the tire 2 and the shortest member 6a of the beam 6.

Having now described my invention, what I claim is:
1. An apparatus for testing tires which comprises
  a drum rotatably mounted on a substantially rigid framework with the axis of rotation of the said drum being horizontal,
  a measuring beam on one end of which the tire can be rotatably mounted,
    the length of the beam extending in substantially the same direction as the axis of rotation of the tire,
  means for moving the tire into engagement with the perpendicular to the axis of rotation thereof to press the axes of rotation of the said drum and the tire being spaced-apart and substantially mutually parallel during testing,
  means for rotating said drum,
  means for applying a force to the tire in a direction perpendicular to the axis of rotation thereof to press the tire against said drum, and,
  means for measuring the force arising from the rotation of the tire acting on the beam in a direction parallel to the axis of rotation of the tire.

2. An apparatus according to claim 1, wherein the measuring beam is pivotally mounted at its end furthest from the end on which the tire is mounted, means being provided for moving the beam and therefore the tire into or out of engagement with the drum.

3. An apparatus according to claim 2, wherein the means for moving the beam comprises a piston and cylinder assembly mounted between the beam and the rigid framework.

4. An apparatus according to claim 1, wherein the means for measuring the force acting in a direction parallel to the tire comprising at least one tension and compression measuring transducer mounted between the end of the beam furthest from the end on which the tire is mounted and the rigid framework.

5. An apparatus according to claim 2, which comprises two horizontally spaced apart co-axial bearings by means of which the beam is pivotally mounted, and two tension and compression measuring transducers, one transducer being connected between each of the two bearings and the framework.

6. An apparatus according to claim 5, wherein means are provided for adjusting the position of the transducers and the bearings in a direction substantially perpendicular to the axes of rotation of the tire and the beam, so as to move the said beam and said axis into a horizontal plane.

7. An apparatus according to claim 1, wherein means are provided for applying the force to the tire substantially perpendicularly to the beam adjacent to that end on which the tire is rotatably mounted.

8. An apparatus according to claim 7, wherein a pressure gauge is provided to measure the force applied to the tire.

9. An apparatus according to claim 7, wherein an adjustable stop is provided by means of which the compression of the tire is determined.

10. An apparatus according to claim 1, wherein a tension and compression measuring gauge is mounted between the tire and the measuring beam.

11. A method of testing a tire comprising rotatably mounting the tire on one end of a beam, pressing said tire against a rotatable drum, the axes of rotation of said tire and the drum being horizontal and spaced apart, rotating the drum and measuring the force arising from said rotation acting on the beam in a direction along the axis of rotation of the tire.

12. A method according to claim 11 wherein the force arising from said rotation is measured by summing the outputs from two horizontally spaced apart tension and compression measuring transducers.

13. A method according to claim 11, wherein the rolling resistance of the tire is measured by measuring the outputs from the two tension and compression measuring transducers to obtain a difference between the two said outputs, said difference representing the rolling resistance of the tire.

References Cited

UNITED STATES PATENTS

| | | | |
|---|---|---|---|
| 2,695,520 | 11/1954 | Karsai | 73—146 |
| 3,142,178 | 7/1964 | Gough et al. | 73—146 |
| 3,375,714 | 4/1968 | Bottasso | 73—146 |

FOREIGN PATENTS

| | | |
|---|---|---|
| 1,233,620 | 2/1967 | Germany. |

DONALD O. WOODIEL, Primary Examiner

PO-1050
(5/69)

UNITED STATES PATENT OFFICE
CERTIFICATE OF CORRECTION

Patent No. 3,527,091          Dated September 8, 1970

Inventor(s) Walter REUS

It is certified that error appears in the above-identified patent and that said Letters Patent are hereby corrected as shown below:

Claim 1, line 11, should read:

"peripheral surface of the said drum for testing"

SIGNED AND
SEALED
NOV 3 1970

(SEAL)
Attest:

Edward M. Fletcher, Jr.
Attesting Officer

WILLIAM E. SCHUYLER, JR.
Commissioner of Patents